(12) United States Patent
Evans et al.

(10) Patent No.: US 7,362,879 B2
(45) Date of Patent: Apr. 22, 2008

(54) SUBSTITUTING OBJECTS BASED ON STEGANOGRAPHIC ENCODING

(75) Inventors: Douglas B. Evans, San Francisco, CA (US); William Y. Conwell, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 11/739,534

(22) Filed: Apr. 24, 2007

(65) Prior Publication Data

US 2007/0286453 A1 Dec. 13, 2007

Related U.S. Application Data

(63) Continuation of application No. 11/145,515, filed on Jun. 3, 2005, now Pat. No. 7,209,573, which is a continuation of application No. 10/448,544, filed on May 29, 2003, now Pat. No. 6,917,691, which is a continuation of application No. 09/473,396, filed on Dec. 28, 1999, now Pat. No. 6,577,746.

(51) Int. Cl.
*G06K 9/00* (2006.01)
*G06K 15/00* (2006.01)
*G06K 9/36* (2006.01)

(52) U.S. Cl. ..................... 382/100; 358/3.28
(58) Field of Classification Search ............... 382/100, 382/112, 232, 305, 306; 358/1.13, 1.18, 358/3.28; 380/203, 252; 705/75; 713/176
See application file for complete search history.

(56) References Cited

U.S. PATENT DOCUMENTS 3,493,674 A 2/1970 Houghton (Continued)

FOREIGN PATENT DOCUMENTS

CA 2235002 12/1998

(Continued)

OTHER PUBLICATIONS van Schyndel et al., "A Digital Watermark," IEEE International Conference on Image Processing, Nov. 13-16, 1994, pp. 86-90.

(Continued)

*Primary Examiner*—Yon J. Couso

(57) ABSTRACT

The application discloses various methods and systems to provide substitute information or objects for, e.g., substitution when making copies of media objects (e.g., audio, video or images). One method includes: receiving i) an identifier obtained from a steganographic encoding encoded in a media object, and ii) state information associated with the steganographic encoding or associated with the media object; obtaining—from a storage location—a substitute media object corresponding to the identifier; adjusting the substitute media object in accordance with the state information; providing the adjusted, substituted media object. Another method includes: receiving an identifier obtained from a steganographically encoded media object; accessing memory associated with at least a portion of the identifier to obtain an address of a remote data repository, the remote data repository including at least a plurality of substitute media objects corresponding respectively to a plurality of identifiers; forwarding: i) at least a portion of the identifier obtained from the steganographic encoding, and ii) an instruction to the remote data repository at the address, wherein the instruction includes a request to provide a substitute media object corresponding to at least a portion of the identifier obtained from the steganographic encoding. Of course, other methods and combinations are provided as well.

25 Claims, 1 Drawing Sheet

U.S. PATENT DOCUMENTS

| | | |
|---|---|---|
| 3,569,619 A | 3/1971 | Simjian |
| 3,576,369 A | 4/1971 | Wick et al. |
| 3,585,290 A | 6/1971 | Sanford |
| 3,655,162 A | 4/1972 | Yamamoto et al. |
| 3,703,628 A | 11/1972 | Philipson, Jr. |
| 3,809,806 A | 5/1974 | Walker et al. |
| 3,838,444 A | 9/1974 | Loughlin et al. |
| 3,914,877 A | 10/1975 | Hines |
| 3,922,074 A | 11/1975 | Ikegami et al. |
| 3,971,917 A | 7/1976 | Maddox et al. |
| 3,977,785 A | 8/1976 | Harris |
| 3,982,064 A | 9/1976 | Barnaby |
| 3,984,624 A | 10/1976 | Waggener |
| 4,025,851 A | 5/1977 | Haselwood et al. |
| 4,184,700 A | 1/1980 | Greenaway |
| 4,225,967 A | 9/1980 | Miwa et al. |
| 4,230,990 A | 10/1980 | Lert, Jr. et al. |
| 4,231,113 A | 10/1980 | Blasbalg |
| 4,238,849 A | 12/1980 | Gassmann |
| 4,252,995 A | 2/1981 | Schmidt et al. |
| 4,262,329 A | 4/1981 | Bright et al. |
| 4,296,326 A | 10/1981 | Haslop et al. |
| 4,297,729 A | 10/1981 | Steynor et al. |
| 4,313,197 A | 1/1982 | Maxemchuk |
| 4,367,488 A | 1/1983 | Leventer et al. |
| 4,379,947 A | 4/1983 | Warner |
| 4,380,027 A | 4/1983 | Leventer et al. |
| 4,389,671 A | 6/1983 | Posner et al. |
| 4,395,600 A | 7/1983 | Lundy et al. |
| 4,416,001 A | 11/1983 | Ackerman |
| 4,423,415 A | 12/1983 | Goldman |
| 4,425,642 A | 1/1984 | Moses et al. |
| 4,476,468 A | 10/1984 | Goldman |
| 4,523,508 A | 6/1985 | Mayer et al. |
| 4,528,588 A | 7/1985 | Lofberg |
| 4,547,804 A | 10/1985 | Greenberg |
| 4,553,261 A | 11/1985 | Froessl |
| 4,590,366 A | 5/1986 | Rothfjell |
| 4,595,950 A | 6/1986 | Lofberg |
| 4,618,257 A | 10/1986 | Bayne et al. |
| 4,637,051 A | 1/1987 | Clark |
| 4,639,779 A | 1/1987 | Greenberg |
| 4,647,974 A | 3/1987 | Butler et al. |
| 4,654,867 A | 3/1987 | Labedz et al. |
| 4,660,221 A | 4/1987 | Dlugos |
| 4,663,518 A | 5/1987 | Borror et al. |
| 4,665,431 A | 5/1987 | Cooper |
| 4,672,605 A | 6/1987 | Hustig et al. |
| 4,675,746 A | 6/1987 | Tetrick et al. |
| 4,677,435 A | 6/1987 | D'Agraives et al. |
| 4,682,794 A | 7/1987 | Margolin |
| 4,703,476 A | 10/1987 | Howard |
| 4,712,103 A | 12/1987 | Gotanda |
| 4,718,106 A | 1/1988 | Weinblatt |
| 4,723,149 A | 2/1988 | Harada |
| 4,739,377 A | 4/1988 | Allen |
| 4,750,173 A | 6/1988 | Bluthgen |
| 4,765,656 A | 8/1988 | Becker et al. |
| 4,775,901 A | 10/1988 | Nakano |
| 4,776,013 A | 10/1988 | Kafri et al. |
| 4,805,020 A | 2/1989 | Greenberg |
| 4,807,031 A | 2/1989 | Broughton et al. |
| 4,811,357 A | 3/1989 | Betts et al. |
| 4,811,408 A | 3/1989 | Goldman |
| 4,820,912 A | 4/1989 | Samyn |
| 4,835,517 A | 5/1989 | van der Gracht et al. |
| 4,855,827 A | 8/1989 | Best |
| 4,864,618 A | 9/1989 | Wright et al. |
| 4,866,771 A | 9/1989 | Bain |
| 4,874,936 A | 10/1989 | Chandler et al. |
| 4,876,617 A | 10/1989 | Best et al. |
| 4,879,747 A | 11/1989 | Leighton et al. |
| 4,884,139 A | 11/1989 | Pommier |
| 4,885,632 A | 12/1989 | Mabey et al. |
| 4,888,798 A | 12/1989 | Earnest |
| 4,903,301 A | 2/1990 | Kondo et al. |
| 4,908,836 A | 3/1990 | Rushforth et al. |
| 4,908,873 A | 3/1990 | Philibert et al. |
| 4,918,484 A | 4/1990 | Ujiie et al. |
| 4,920,503 A | 4/1990 | Cook |
| 4,921,278 A | 5/1990 | Shiang et al. |
| 4,939,515 A | 7/1990 | Adelson |
| 4,941,150 A | 7/1990 | Iwasaki |
| 4,943,973 A | 7/1990 | Werner |
| 4,943,976 A | 7/1990 | Ishigaki |
| 4,944,036 A | 7/1990 | Hyatt |
| 4,947,028 A | 8/1990 | Gorog |
| 4,963,998 A | 10/1990 | Maufe |
| 4,965,827 A | 10/1990 | McDonald |
| 4,967,273 A | 10/1990 | Greenberg |
| 4,969,041 A | 11/1990 | O'Grady et al. |
| 4,972,471 A | 11/1990 | Gross et al. |
| 4,972,475 A | 11/1990 | Sant'Anselmo |
| 4,972,476 A | 11/1990 | Nathans |
| 4,977,594 A | 12/1990 | Shear |
| 4,979,210 A | 12/1990 | Nagata et al. |
| 4,996,530 A | 2/1991 | Hilton |
| 5,003,590 A | 3/1991 | Lechner et al. |
| 5,010,405 A | 4/1991 | Schreiber et al. |
| 5,023,907 A | 6/1991 | Johnson |
| 5,027,401 A | 6/1991 | Soltesz |
| 5,034,982 A | 7/1991 | Heninger et al. |
| 5,036,513 A | 7/1991 | Greenblatt |
| 5,040,059 A | 8/1991 | Leberl |
| 5,053,956 A | 10/1991 | Donald |
| 5,062,666 A | 11/1991 | Mowry et al. |
| 5,063,446 A | 11/1991 | Gibson |
| 5,073,899 A | 12/1991 | Collier et al. |
| 5,073,925 A | 12/1991 | Nagata et al. |
| 5,075,773 A | 12/1991 | Pullen et al. |
| 5,077,608 A | 12/1991 | Dubner |
| 5,077,795 A | 12/1991 | Rourke et al. |
| 5,079,648 A | 1/1992 | Maufe |
| 5,091,966 A | 2/1992 | Bloomberg et al. |
| 5,095,196 A | 3/1992 | Miyata |
| 5,103,459 A | 4/1992 | Gilhousen et al. |
| 5,113,437 A | 5/1992 | Best |
| 5,113,445 A | 5/1992 | Wang |
| 5,128,525 A | 7/1992 | Stearns et al. |
| 5,144,660 A | 9/1992 | Rose |
| 5,146,457 A | 9/1992 | Veldhuis et al. |
| 5,148,498 A | 9/1992 | Resnikoff et al. |
| 5,150,409 A | 9/1992 | Elsner |
| 5,161,210 A | 11/1992 | Druyvesteyn et al. |
| 5,166,676 A | 11/1992 | Milheiser |
| 5,168,146 A | 12/1992 | Marshall et al. |
| 5,181,786 A | 1/1993 | Hujink |
| 5,185,736 A | 2/1993 | Tyrrell et al. |
| 5,199,081 A | 3/1993 | Saito et al. |
| 5,200,822 A | 4/1993 | Bronfin et al. |
| 5,212,551 A | 5/1993 | Conanan |
| 5,213,337 A | 5/1993 | Sherman |
| 5,216,724 A | 6/1993 | Suzuki et al. |
| 5,228,056 A | 7/1993 | Schilling |
| 5,243,411 A | 9/1993 | Shirochi et al. |
| 5,243,423 A | 9/1993 | DeJean et al. |
| 5,245,165 A | 9/1993 | Zhang |
| 5,245,329 A | 9/1993 | Gokcebay |
| 5,247,364 A | 9/1993 | Banker et al. |
| 5,253,078 A | 10/1993 | Balkanski et al. |
| 5,257,119 A | 10/1993 | Funada et al. |
| 5,259,025 A | 11/1993 | Monroe et al. |
| 5,267,334 A | 11/1993 | Normille et al. |
| 5,280,537 A | 1/1994 | Sugiyama et al. |

| | | | | | | |
|---|---|---|---|---|---|---|
| 5,288,976 A | 2/1994 | Citron | | 5,568,550 A | 10/1996 | Ur |
| 5,291,243 A | 3/1994 | Heckman et al. | | 5,568,570 A | 10/1996 | Rabbani |
| 5,293,399 A | 3/1994 | Hefti | | 5,572,010 A | 11/1996 | Petrie |
| 5,295,203 A | 3/1994 | Krause et al. | | 5,572,247 A | 11/1996 | Montgomery |
| 5,299,019 A | 3/1994 | Pack et al. | | 5,576,532 A | 11/1996 | Hecht |
| 5,305,400 A | 4/1994 | Butera | | 5,579,124 A | 11/1996 | Aijala et al. |
| 5,315,098 A | 5/1994 | Tow | | 5,581,686 A * | 12/1996 | Koppolu et al. ............. 715/784 |
| 5,319,453 A | 6/1994 | Copriviza et al. | | 5,581,760 A * | 12/1996 | Atkinson et al. ........... 717/108 |
| 5,319,724 A | 6/1994 | Blonstein et al. | | 5,582,103 A | 12/1996 | Tanaka et al. |
| 5,319,735 A | 6/1994 | Preuss et al. | | 5,587,743 A | 12/1996 | Montgomery |
| 5,321,470 A | 6/1994 | Hasuo et al. | | 5,590,197 A | 12/1996 | Chen et al. |
| 5,325,167 A | 6/1994 | Melen | | 5,592,622 A * | 1/1997 | Isfeld et al. ................ 709/207 |
| 5,327,237 A | 7/1994 | Gerdes et al. | | 5,594,226 A | 1/1997 | Steger |
| 5,337,362 A | 8/1994 | Gormish et al. | | 5,598,526 A | 1/1997 | Daniel et al. |
| 5,349,655 A | 9/1994 | Mann | | 5,602,920 A | 2/1997 | Bestler et al. |
| 5,351,302 A | 9/1994 | Leighton et al. | | 5,606,609 A | 2/1997 | Houser et al. |
| 5,371,792 A | 12/1994 | Asai et al. | | 5,611,575 A | 3/1997 | Petrie |
| 5,374,976 A | 12/1994 | Spannenburg | | 5,613,004 A | 3/1997 | Cooperman et al. |
| 5,379,345 A | 1/1995 | Greenberg | | 5,613,012 A | 3/1997 | Hoffman et al. |
| 5,385,371 A | 1/1995 | Izawa | | 5,614,940 A | 3/1997 | Cobbley et al. |
| 5,387,941 A | 2/1995 | Montgomery et al. | | 5,617,119 A | 4/1997 | Briggs et al. |
| 5,394,274 A | 2/1995 | Kahn | | 5,617,148 A | 4/1997 | Montgomery |
| 5,396,559 A | 3/1995 | McGrew | | 5,629,770 A | 5/1997 | Brassil |
| 5,398,283 A | 3/1995 | Virga | | 5,629,980 A | 5/1997 | Stefik et al. |
| 5,404,160 A | 4/1995 | Schober et al. | | 5,636,292 A | 6/1997 | Rhoads |
| 5,404,377 A | 4/1995 | Moses | | 5,638,443 A | 6/1997 | Stefik |
| 5,408,542 A | 4/1995 | Callahan | | 5,638,446 A | 6/1997 | Rubin |
| 5,416,307 A | 5/1995 | Danek et al. | | 5,640,193 A | 6/1997 | Wellner |
| 5,418,853 A | 5/1995 | Kanota et al. | | 5,646,999 A | 7/1997 | Saito |
| 5,422,963 A | 6/1995 | Chen et al. | | 5,652,626 A | 7/1997 | Kawakami et al. |
| 5,422,995 A | 6/1995 | Aoki et al. | | 5,659,164 A | 8/1997 | Schmid |
| 5,425,100 A | 6/1995 | Thomas et al. | | 5,661,574 A | 8/1997 | Kawana |
| 5,428,606 A | 6/1995 | Moskowitz | | 5,663,766 A | 9/1997 | Sizer, II |
| 5,428,607 A | 6/1995 | Hiller et al. | | 5,664,018 A | 9/1997 | Leighton |
| 5,428,731 A | 6/1995 | Powers | | 5,665,951 A | 9/1997 | Newman et al. |
| 5,432,542 A | 7/1995 | Thibadeau et al. | | 5,666,487 A | 9/1997 | Goodman et al. |
| 5,432,870 A | 7/1995 | Schwartz | | 5,668,636 A | 9/1997 | Beach et al. |
| 5,444,518 A | 8/1995 | Hashiguchi et al. | | 5,671,282 A | 9/1997 | Wolff et al. |
| 5,446,273 A | 8/1995 | Leslie | | 5,673,316 A | 9/1997 | Auerbach et al. |
| 5,448,375 A | 9/1995 | Cooper et al. | | 5,687,236 A | 11/1997 | Moskowitz et al. |
| 5,450,122 A | 9/1995 | Keene | | 5,692,073 A | 11/1997 | Cass |
| 5,450,490 A | 9/1995 | Jensen et al. | | 5,710,636 A | 1/1998 | Curry |
| 5,461,426 A | 10/1995 | Limberg et al. | | 5,717,940 A | 2/1998 | Peairs et al. |
| 5,463,209 A | 10/1995 | Figh et al. | | 5,719,939 A | 2/1998 | Tel |
| 5,469,222 A | 11/1995 | Sprague | | 5,721,788 A | 2/1998 | Powell et al. |
| 5,469,506 A | 11/1995 | Berson et al. | | 5,727,092 A | 3/1998 | Sandford, II et al. |
| 5,473,631 A | 12/1995 | Moses | | 5,735,547 A | 4/1998 | Morelle et al. |
| 5,479,168 A | 12/1995 | Johnson et al. | | 5,740,244 A | 4/1998 | Indeck et al. |
| 5,481,294 A | 1/1996 | Thomas et al. | | 5,742,845 A | 4/1998 | Wagner |
| 5,486,686 A | 1/1996 | Zdybel, Jr. | | 5,745,604 A | 4/1998 | Rhoads |
| 5,488,664 A | 1/1996 | Shamir | | 5,754,308 A | 5/1998 | Lopresti et al. |
| 5,493,677 A | 2/1996 | Balogh et al. | | 5,761,686 A | 6/1998 | Bloomberg |
| 5,495,581 A | 2/1996 | Tsai | | 5,765,152 A | 6/1998 | Erickson |
| 5,496,071 A | 3/1996 | Walsh | | 5,765,176 A | 6/1998 | Bloomberg |
| 5,499,294 A | 3/1996 | Friedman | | 5,768,426 A | 6/1998 | Rhoads |
| 5,502,576 A | 3/1996 | Ramsay et al. | | 5,778,102 A | 7/1998 | Sandford, II et al. |
| 5,515,081 A | 5/1996 | Vasilik | | 5,790,693 A | 8/1998 | Graves et al. |
| 5,515,451 A | 5/1996 | Tsuji | | 5,790,697 A | 8/1998 | Munro et al. |
| 5,521,722 A | 5/1996 | Colvill et al. | | 5,804,803 A | 9/1998 | Cragun et al. |
| 5,524,933 A | 6/1996 | Kunt et al. | | 5,809,160 A | 9/1998 | Powell et al. |
| 5,530,751 A | 6/1996 | Morris | | 5,809,317 A | 9/1998 | Kogan et al. |
| 5,530,759 A | 6/1996 | Braudaway et al. | | 5,817,205 A | 10/1998 | Kaule |
| 5,530,852 A | 6/1996 | Meske, Jr. et al. | | 5,818,441 A | 10/1998 | Throckmorton et al. |
| 5,532,920 A | 7/1996 | Hartrick et al. | | 5,819,289 A | 10/1998 | Sanford, II et al. |
| 5,537,223 A | 7/1996 | Curry | | 5,825,871 A | 10/1998 | Mark |
| 5,539,471 A | 7/1996 | Myhrvold et al. | | 5,825,892 A | 10/1998 | Braudaway et al. |
| 5,539,735 A | 7/1996 | Moskowitz | | 5,838,458 A | 11/1998 | Tsai |
| 5,541,662 A | 7/1996 | Adams et al. | | 5,838,459 A | 11/1998 | Hashimoto |
| 5,544,255 A | 8/1996 | Smithies et al. | | 5,841,978 A | 11/1998 | Rhoads |
| 5,548,646 A | 8/1996 | Aziz et al. | | 5,848,144 A | 12/1998 | Ahrens |
| 5,557,333 A | 9/1996 | Jungo et al. | | 5,848,413 A | 12/1998 | Wolff |
| 5,559,559 A | 9/1996 | Jungo et al. | | 5,852,673 A | 12/1998 | Young |
| 5,568,179 A | 10/1996 | Diehl et al. | | 5,857,038 A | 1/1999 | Owada et al. |

| | | | |
|---|---|---|---|
| 5,859,935 A | 1/1999 | Johnson et al. | |
| 5,862,218 A | 1/1999 | Steinberg | |
| 5,862,260 A | 1/1999 | Rhoads | |
| 5,866,888 A | 2/1999 | Bravman et al. | |
| 5,869,819 A | 2/1999 | Knowles et al. | |
| 5,871,615 A | 2/1999 | Harris | |
| 5,872,589 A | 2/1999 | Morales | |
| 5,875,249 A | 2/1999 | Mintzer et al. | |
| 5,878,434 A | 3/1999 | Draper et al. | |
| 5,892,900 A | 4/1999 | Ginter et al. | |
| 5,893,101 A | 4/1999 | Balogh et al. | |
| 5,893,908 A | 4/1999 | Cullen et al. | |
| 5,898,779 A | 4/1999 | Squilla et al. | |
| 5,900,608 A | 5/1999 | Iida | |
| 5,901,224 A | 5/1999 | Hecht | |
| 5,902,353 A | 5/1999 | Reber et al. | |
| 5,903,729 A | 5/1999 | Reber et al. | |
| 5,905,248 A | 5/1999 | Russell et al. | |
| 5,905,251 A | 5/1999 | Knowles | |
| 5,905,810 A | 5/1999 | Jones et al. | |
| 5,913,210 A | 6/1999 | Call | |
| 5,915,027 A | 6/1999 | Cox et al. | |
| 5,930,767 A | 7/1999 | Reber et al. | |
| 5,932,862 A | 8/1999 | Hussey et al. | |
| 5,932,863 A | 8/1999 | Reber et al. | |
| 5,933,798 A | 8/1999 | Linnartz | |
| 5,933,829 A | 8/1999 | Durst et al. | |
| 5,938,726 A | 8/1999 | Reber et al. | |
| 5,938,727 A | 8/1999 | Ikeda | |
| 5,939,695 A | 8/1999 | Nelson | |
| 5,940,595 A | 8/1999 | Reber et al. | |
| 5,943,422 A | 8/1999 | Van Wie et al. | |
| 5,946,414 A | 8/1999 | Cass et al. | |
| 5,949,055 A | 9/1999 | Fleet et al. | |
| 5,949,885 A | 9/1999 | Leighton | |
| 5,950,173 A | 9/1999 | Perkowski | |
| 5,963,916 A | 10/1999 | Kaplan | |
| 5,971,277 A | 10/1999 | Cragun et al. | |
| 5,974,141 A | 10/1999 | Saito | |
| 5,974,548 A | 10/1999 | Adams | |
| 5,978,477 A | 11/1999 | Hull et al. | |
| 5,978,773 A | 11/1999 | Hudetz et al. | |
| 5,979,757 A | 11/1999 | Tracy et al. | |
| 5,983,218 A | 11/1999 | Syeda-Mahmood | |
| 5,986,651 A | 11/1999 | Reber et al. | |
| 5,991,426 A | 11/1999 | Cox et al. | |
| 5,995,105 A | 11/1999 | Reber et al. | |
| 5,995,978 A | 11/1999 | Cullen et al. | |
| 6,005,501 A | 12/1999 | Wolosewicz | |
| 6,006,226 A | 12/1999 | Cullen et al. | |
| 6,024,287 A | 2/2000 | Takai et al. | |
| 6,035,177 A | 3/2000 | Moses et al. | |
| 6,052,486 A | 4/2000 | Knowlton et al. | |
| 6,064,764 A | 5/2000 | Bhaskaran et al. | |
| 6,085,205 A | 7/2000 | Peairs et al. | |
| 6,122,403 A | 9/2000 | Rhoads | |
| 6,166,750 A | 12/2000 | Negishi | |
| 6,182,090 B1 | 1/2001 | Peairs | |
| 6,188,787 B1 | 2/2001 | Ohmae et al. | |
| 6,199,073 B1 | 3/2001 | Peairs et al. | |
| 6,243,480 B1 | 6/2001 | Zhao et al. | |
| 6,252,963 B1 | 6/2001 | Rhoads | |
| 6,266,430 B1 | 7/2001 | Rhoads | |
| 6,286,036 B1 | 9/2001 | Rhoads | |
| 6,301,360 B1 | 10/2001 | Bocionek et al. | |
| 6,311,214 B1 | 10/2001 | Rhoads | |
| 6,314,457 B1 | 11/2001 | Schena | |
| 6,321,648 B1 | 11/2001 | Berson et al. | |
| 6,321,981 B1 | 11/2001 | Ray et al. | |
| 6,324,573 B1 | 11/2001 | Rhoads | |
| 6,324,574 B1 | 11/2001 | Gong | |
| 6,334,721 B1 | 1/2002 | Horigane | |
| 6,343,138 B1 | 1/2002 | Rhoads | |
| 6,343,204 B1 | 1/2002 | Yang | |
| 6,345,104 B1 | 2/2002 | Rhoads | |
| 6,351,815 B1 | 2/2002 | Adams | |
| 6,359,985 B1 | 3/2002 | Koch et al. | |
| 6,366,685 B1 | 4/2002 | Tarasaki | |
| 6,427,020 B1 | 7/2002 | Rhoads | |
| 6,439,465 B1 | 8/2002 | Bloomberg | |
| 6,445,468 B1 | 9/2002 | Tsai | |
| 6,449,377 B1 | 9/2002 | Rhoads | |
| 6,466,329 B1 | 10/2002 | Mukai | |
| 6,490,681 B1 | 12/2002 | Kobayashi et al. | |
| 6,505,160 B1 | 1/2003 | Levy et al. | |
| 6,512,837 B1 | 1/2003 | Ahmed | |
| 6,515,755 B1 | 2/2003 | Hawegawa | |
| 6,522,770 B1 | 2/2003 | Seder et al. | |
| 6,522,771 B2 | 2/2003 | Rhoads | |
| 6,549,638 B2 | 4/2003 | Davis et al. | |
| 6,574,350 B1 | 6/2003 | Rhoads et al. | |
| 6,577,746 B1 | 6/2003 | Evans et al. | |
| 6,580,819 B1 | 6/2003 | Rhoads | |
| 6,600,571 B1 | 7/2003 | Ito | |
| 6,668,068 B2 | 12/2003 | Hashimoto | |
| 6,786,397 B2 | 9/2004 | Silverbrook et al. | |
| 6,804,376 B2 | 10/2004 | Rhoads et al. | |
| 6,829,368 B2 | 12/2004 | Meyer et al. | |
| 2001/0016852 A1 | 8/2001 | Peairs et al. | |
| 2001/0017709 A1 | 8/2001 | Murakami et al. | |
| 2001/0022667 A1 | 9/2001 | Yoda | |
| 2001/0024510 A1 | 9/2001 | Iwamura | |
| 2001/0026377 A1 | 10/2001 | Ikegami | |
| 2001/0026629 A1 | 10/2001 | Oki | |
| 2001/0028725 A1 | 10/2001 | Nakagawa | |
| 2001/0028727 A1 | 10/2001 | Naito et al. | |
| 2001/0030759 A1 | 10/2001 | Hayashi et al. | |
| 2001/0031066 A1 | 10/2001 | Meyer et al. | |
| 2001/0043362 A1 | 11/2001 | Hull et al. | |
| 2001/0053299 A1 | 12/2001 | Matsunoshita et al. | |
| 2002/0001095 A1 | 1/2002 | Kawakami et al. | |
| 2002/0003891 A1 | 1/2002 | Hoshino | |
| 2002/0009208 A1 | 1/2002 | Alattar et al. | |
| 2002/0010684 A1 | 1/2002 | Moskowitz | |
| 2002/0018228 A1 | 2/2002 | Torigoe | |
| 2002/0023148 A1 | 2/2002 | Ritz | |
| 2002/0027994 A1 | 3/2002 | Katayama | |
| 2002/0037091 A1 | 3/2002 | Terasaki | |
| 2002/0040323 A1 | 4/2002 | Lee | |
| 2002/0049580 A1 | 4/2002 | Kutaragi | |
| 2002/0051237 A1 | 5/2002 | Ohara | |
| 2002/0059384 A1 | 5/2002 | Kaars | |
| 2002/0071556 A1 | 6/2002 | Moskowitz | |
| 2002/0073319 A1 | 6/2002 | Manabe | |
| 2002/0075298 A1 | 6/2002 | Schena | |
| 2002/0080396 A1 | 6/2002 | Silverbbrook | |
| 2002/0080964 A1 | 6/2002 | Stone | |
| 2002/0120515 A1 | 8/2002 | Morimoto | |
| 2002/0126762 A1 | 9/2002 | Tanaka | |
| 2002/0154778 A1 | 10/2002 | Mihcak | |
| 2002/0165793 A1 | 11/2002 | Brand | |
| 2003/0069852 A1 | 4/2003 | Bryant | |
| 2003/0077096 A1 | 4/2003 | Potter | |
| 2004/0148408 A1 | 7/2004 | Nadarajah | |

FOREIGN PATENT DOCUMENTS

| | | |
|---|---|---|
| DE | 3806411 | 9/1989 |
| DE | 19521969 | 2/1997 |
| EP | 366381 | 10/1989 |
| EP | 372 601 | 6/1990 |
| EP | 411 232 | 2/1991 |
| EP | 441 702 | 8/1991 |
| EP | 418 964 | 9/1991 |
| EP | 493 091 | 7/1992 |
| EP | 058 482 | 8/1992 |

| | | |
|---|---|---|
| EP | 551 016 | 7/1993 |
| EP | 581 317 | 2/1994 |
| EP | 605 208 | 7/1994 |
| EP | 649 074 | 4/1995 |
| EP | 705 025 | 4/1996 |
| EP | 711061 | 5/1996 |
| EP | 0789480 | 8/1997 |
| EP | 872995 | 10/1998 |
| EP | 0642060 | 4/1999 |
| EP | 975147 | 1/2000 |
| EP | 1122939 | 8/2001 |
| EP | 1147495 | 10/2001 |
| GB | 2063018 | 5/1981 |
| GB | 2067871 | 7/1981 |
| GB | 2196167 | 4/1988 |
| GB | 5504984 | 11/1988 |
| GB | 2344482 | 6/2000 |
| GB | 2346110 | 8/2000 |
| JP | 4-248771 | 2/1992 |
| JP | 5/242217 | 9/1993 |
| JP | 8-30759 | 2/1996 |
| JP | 08-50598 | 2/1996 |
| WO | WO 89/08915 | 9/1989 |
| WO | WO 93/25038 | 12/1993 |
| WO | WO94/27228 | 11/1994 |
| WO | WO95/04665 | 2/1995 |
| WO | WO95/10813 | 4/1995 |
| WO | WO 95/10835 | 4/1995 |
| WO | WO 95/14289 | 5/1995 |
| WO | WO 95/20291 | 7/1995 |
| WO | WO 96/26494 | 8/1996 |
| WO | WO 96/27259 | 9/1996 |
| WO | WO97/43736 | 11/1997 |
| WO | WO98/14887 | 4/1998 |
| WO | 98/20411 | 5/1998 |
| WO | WO 98/20411 | 5/1998 |
| WO | WO98/20642 | 5/1998 |
| WO | WO98/24050 | 6/1998 |
| WO | WO98/40823 | 9/1998 |
| WO | WO98/49813 | 11/1998 |
| WO | WO99/3277 | 7/1999 |
| WO | WO99/36876 | 7/1999 |
| WO | WO00/44131 | 7/2000 |
| WO | WO 01/08405 | 2/2001 |
| WO | WO 01/80169 | 10/2001 |
| WO | WO 02/03385 | 1/2002 |
| WO | WO 0239719 | 5/2002 |

OTHER PUBLICATIONS

Zhao et al., "Embedding Robust Labels Into Images for Copyright Protection," Proc. of the International Congress on Intellectual Property Rights for Specialized Information, Knowledge and New Technologies (Vienna, Austria) Aug. 21-25, 1995, 10 pages.
Bender, "Applications for Data Hiding, " IBM Systems Journal, vol. 39, No. 3-4, pp. 547-568, 2000.
Gruhl et al., "Information Hiding to Foil the Caual Counterfeiter," Proc. 2d Information Hiding Workshop, LNCS vol. 1525, pp. 1-15 (Apr. 15, 1998).
Simmons, "Subliminal Channels; Past and Present," ETT, vol. 5, No. 4, Jul.-Aug. 1994, pp. 45-59.
Sheng et al., "Experiments on Pattern Recognition Using Invariant Fourier-Mellen Descriptors," Journal of Optical Society of America, vol. 3, No. 6, Jun. 1986, pp. 771-776.
Sklar, "A Structured Overview of Digital Communications-a Tutorial Review-Part I," IEEE Communications Magazine, Aug., 1983, pp. 1-17.
Sklar, "A Structured Overview of Digital Communications-a Tutorial Review-Part II," IEEE Communications Magazine, Oct., 1983, pp. 6-21.
"Steganography," Intellectual Property and the National Information Infrastructure The Report of the Working Group on Intellectual Property Rights, Sep. 1995, pp. 212-213.

Tanaka et al., "Embedding Secret Information Into a Dithered Multi-Level Image," Proc. IEEE Military Comm. Conf., Sep. 1990, pp. 216-220.
Tanaka, "Embedding the Attribute Information Into a Dithered Image," Systems and Computers in Japan, vol. 21, No. 7, 1990, pp. 43-50.
Tirkel et al., "A Two-Dimensional Digital Watermark," 1995, 6 pages.
Toga et al., "Registration Revisited," Journal of Neuroscience Methods, 48 (1993), pp. 1-13. van Schyndel et al., "Towards a Robust Digital Watermark," ACCV '95, vol. 2, Dec., 1995, pp. 504-508.
Wagner, "Fingerprinting,"1983 IEEE, pp. 18-22.
Walton, "Image Authentication for a Slippery New Age," Dr. Dobb's Journal, Apr. 1995, pp. 18-26, 82-87.
Wise, "The History of Copyright Photographers' Rights Span Three Centuries," Photo>Electroni Imaging, vol. 37, No. 6, 1994.
"Access Control and COpyright Protection for Images, WorkPackage 8: Watermarking," Jun. 30, 1995, 46 pages.
"Access Control and COpyright Protection for Images, WorkPackage 3: Evaluation of Existing Systems," Apr. 19, 1995, 68 pages.
"Access Control and COpyright Protection for Images, WorkPackage 1: Access Control and Copyright Protection for Images Need Evaluation," Jun., 1995, 21 pages.
Arachelian, "White Noise Storm," Apr. 11, 1994, Internet reference, 13 pages.
Arazi, et al., "Intuition, Perception, and Secure Communication," IEEE Transactionson Systems, man, and Cybernetics, vol. 19, No. 5, Sep./Oct. 1989, pp. 1016-1020.
Arthur, "Digital Fingerprints Protect Artwork," New Scientist, Nov. 12, 1994, p. 24.
Aura, "Invisible Communication," Helsinki University of Technology, Digital Systems Laboratory, Nov. 5, 1995, 13 pages.
Bender et al, "Techniques for Data Hiding," Draft Preprint, Private Correspondence, dated Oct. 30, 1995.
Bender et al., "Techniques for Data Hiding," Massachusetts Institute of Technology, Media Laboratory, Jan. 1995, 10 pages.
Boneh, "Collusion-Secure Fingerprinting for Digital Data," Department of Computer Science, Princeton University, 1995, 31 pages.
Boney et al., "Digital Watermarks for Audio Signals," Proceedings of Multimedia '96, 1996.
Boucwueau et al., Equitable Conditional Access and Copyright Protection for Image Based on Trusted Third Parties, Teleservices & Multimedia Communications, 2nd Int. Cost 237 Workshop, Second International Cost 237 Workshop, Nov., 1995; published 1996, pp. 229-243.
Brassil et al., "Hiding Information in Document Images," Nov., 1995, 7 pages.
Brown, "S-Tools for Windows, Version 1.00, .COPYRGT. 1994 Andy Brown, What is Steganography," Internet reference, Mar. 6, 1994, 6 pages.
Bruyndonkx et al., Neural Network Post-Processing of Coded Images Using Perceptual Masking, 1994, 3 pages.
Bruyndonckx et al., "Spatial Method for Copyright Labeling of Digital Images," 1994, 6 pages.
Burgett et al., "A Novel Method for Copyright Labeling Digitized Image Data," requested by e-mail from author (unavailable/password protected on IGD WWW site); recieved Sep. 18, 1995, 12 pages.
Caronni, "Assuring Ownership Rights for Digital Images," Published in the Proceedings of Reliable IT Systems, VIS '95, HH. Bruggemann and W. Gerhardt-Hackl (Ed.), Viewing Publishing Company, Germany, 1995, Jun. 14, 1994, 10 pages.
Caruso, "Digital Commerce, 2 plans for watermarks, which can bind proof of authorship to electronic works." New York Times, Aug. 7, 1995, one page.
Choudhury, et al., "Copyright Protection for Electronic Publishing over Computer networks," IEEE Network Magazine, Jun. 1994, 18 pages.
Clarke, "Invisible Code Tags Electronic Images," 0 Electric Engineering Times, Jun. 12, 1995, n. 852, p. 42.
"Copyright Protection for Digital Images, Digital Fingerprinting from FBI," Highwater FBI brochure, 1995, 4 pages.

Cox et al., "Secure Spread Spectrum Watermarking for Multimedia," NEC Research Institute Technical Report, Dec. 5, 1995, 33 pages.

Cox et al., "A Secure, Imperceptable Yet Perceptually Salient, Spread Spectrum Watermark for Multimedia," IEEE, Southcon/96, Conference record, pp. 192-197, 1996.

"Cyphertech Systems: Introduce Digital Encoding Device to Prevent TV Piracy," Hollywood Reporter, Oct. 20, 1993, p. 23.

JPEG Group's JPEG Sofware (release 4), ftp.csua.berekeley.edu/pub/cypherpunks/applications/jsteg/jpeg.announcement.gz. . Kassam, Signal Detection in Non-Gaussian Noise, Dowden & Culver, 1998, pp. 1-96.

Johhnson, "Steganography," Dec. 1995, 32 pages.

"Holographic signatures for digital images," The Seybold Report on Desktop Publishing, Aug. 1995, one page.

Delaigle et al., "Digital Watermarking," Proc. SPIE-Int. Soc. Opt. Eng., vol. 2659, pp. 99-110, 1996.

Delaigle et al., "A psychovisual Approach for Digital Picture Watermarking," 1995, 20 pages.

Digimarc presentation at RSA Conference, approximately Jan. 17, 1996, 4 pages.

Fitzgerald, "Invisible Digital Copyright ID," Editor & Publisher, Jun. 25, 1994, p. 62.

"Foiling Card Forgers With Magnetic Noise," Wall Street Journal, Feb. 8, 1994.

Frequently Asked Questions About Digimarc Signature Technology, Aug. 1, 1995, http://www.digimarc.com, 9 pages.

Friedman, "The Trustworthy Digital Camera: Restoring Credibility to the Photographic Image," IEEE Transactions on Consumer Electronics, vol. 39, No. 4, Nov., 1993, pp. 905-910.

Hartung et al., Digital Watermarking of Raw and Compressed Video, Proc. SPIE 2952, Digital Compression Technologies Compression Technologies and Systems for VIdeo Communications, Oct., 1996, pp. 205-213.

Hecht, "Embedded Data Glyph Technology for Hardcopy Digital Documents," SPIE vol. 2171, Feb. 1994, pp. 341-352.

Koch et al., "Digital Copyright Labeling: Providing Evidence of Misuse and Tracking Unauthorized Distribution of Copyright Materials," Oasis Magazine, Dec. 1995, 3 pages.

Luc, "Analysis of Spread Spectrum System Parameters for Design of Hidden Transmission," Radioengineering, vol. 4, No. 2, Jun. 1995, pp. 26-29.

Machado, "Announcing Stego 1.0a2, the First Steganography Tool for the Macintosh," Internet reference, Nov. 28, 1993, 3 pages.

Macq, "Cryptology for Digital TV Braodcasting," Proceedings of the IEEE, vol. 83, No. 6, Jun. 1995, pp. 944-957.

Matthews, "When Seeing is Not Believing," New Scientist, Oct. 16, 1993, pp. 13-15.

Matsui et al., "Video-Steganography: How to Secretly Embed a Signature in a Picture," IMA Intellectual Property Project Proceedings, Jan. 1994, vol. 1, Issue 1, pp. 187-205.

Moller, et al., "Rechnergestutzte Steganographie: Wie sie Funktioniert und warurn folglich jede Reglementierung von Verschlusselung unsinnig ist," DuD, Datenschutz und Datensicherung, Jun. 18, 1994, 318-326.

"NAB--Cyphertech Starts anti-Piracy Broadcast Tests," Newsbytes, NEW0320023, Mar. 23, 1994.

Nakamura et al., "A Unified Coding Method of Image and Text Data Using Discrete Orthogonal Transform," Systems and Computers in Japan, vol. 21, No. 3, 1990, pp. 87-92.

Nakamura et al., "A Unified Coding Method of Dithered Image and Text Data using Micropatterns," Electronics and Communications in Japan, Part 1, vol. 72, No. 4, 1989, pp. 50-56.

New Product Information, "FBI at AppleExpo" (Olympia, London), Nov., 1995, 2 pages.

Ohnishi et al., Embedding a seal into a Picture Under Orthogonal Wavelet Transform, Proceedings of Multimedia '96, 1996, IEEE, pp. 514-421.

ORuanaidh et al, "Watermarking Digital Images for Copyright Protection," http://www.kalman.mee.tcd.ie/people/jjr/eva.sub.--pap.html, Feb. 2, 1996, 8 pages. (Also published Aug., 1996, IEE Proceedings-Vision, Image and Signal Processing, vol. 143, No. 4, pp. 250-256.).

Pennebaker et al., JPEG Still Image Data Compression Standard, Chapter 3, "Aspects of the Human Visual System," pp. 23-27, 1993, Van Nostrand reinhold, New York.

Pickholtz et al., "Theory of Spread-Spectrum Communications-- A Tutorial," Transactions on Communications, vol. COM-30, No. 5, May, 1982, pp. 855-884.

Pitas et al., "Applying Signatures on Digital Images," IEEE Workshop on Nonlinear Image and Signal Processing, Neos Marmaras, Greece, pp. 460-463, Jun., 1995.

Port, "Halting Highway Robbery on the Internet," Business Week, Oct. 17, 1994, p. 212.

Sapwater et al., "Electronic Copyright Protection," Photo>Electronic Imaging, vol. 37, No. 6, 1994, pp. 16-21.

Schneier, "Digital Signatures, Cryptographic Algorithms Can Create Nonforgeable Signatures for Electric Documents, Making Them Valid Legal Instruments" BYTE, Nov. 1993, pp. 309-312.

Shaggy@phantom.com, "Hide and Seek v. 40, " Internet reference, Apr. 10, 1994, 3 pages.

Short, "Steps Toward Unmasked Secure Communications," International Journal of Bifurcation and Chaos, vol. 4, 1994, pp. 959-977.

Audio Watermarking Architectures for Secure Digital Music Distribution, A Proposal to the SDMI Portable Devices Working group by ARIS Technologies, Inc, Mar. 26, 1999, pp. 1-11.

Audio Watermarking Architectures for Persistent Protection, Presentation to SDMI PDWG, Mar. 29, 1999, J. Winograd, Aris Technolgies, pp. 1-16.

Audio Watermarking System to Screen Digital Audio Content for LCM Acceptance, A Proposal Submitted in Response to PDWG99050501--Transition Cfp by ARIS Technologies, Inc., May 23, 1999, Document Version 1.0, 15 apges.

Boland et al., "Watermarking Digital Images for Copyright Protection", Fifth Int'l Conference on Image rocessing and it's Application, Jul. 1995, pp. 326-330.

Levy, "AIPL's Proposal for SDMI: An Underlying Security System" (slide presentation), Mar. 29, 1999, 23 slides.

Microsoft Response to CfP for Technology Solutions to Screen Digital Audio Content for LCM Acceptance, SDMI, PDWG Tokyo, May 23, 1999, 9 pages.

Standford II et al., "The Data Embedding Method", Proceedings of the SPIE vol. 2615, pp. 226-259, 1996.

Thomas, Keith, Screening Technology for Content from Compact Discs, May 24, 1999, 11 pages.

Vidal et al., "Non-Noticeable Information Embedding in Color Images:Marking and Detection", IEEE 1999, pp. 293-297.

Wolfgang et al., "A Watermark for Digital Images," Computer Vision and Image Processing Laboratory, Purdue University, Sep. 1996, pp. 219-222.

Cookson, Chris, General Principles of Music Uses on Portable Devices, presented to SDMI, Mar. 5, 199.

Winograd, J.M., "Audio Watermarking Architecture for Secure Digital Music Distribution," a Proposal to the SDMI Poratable Devices Working Group, by ARIS Technologies, Inc., Mar. 26, 1999.

Mintzer et al., "Safeguarding Digital Library Contents and Users: Digital Watermarking," D-Lib Magazine, Dec. 1997, 12 pages.

Szepanski, "A Signal Theoretic Method fro Creating Forgery-proof Documents for Automatic Verification," Proceedings 1979 Carnahan Conference on Crime Countermeasures, May 16, 1979, pp. 101-109.

Dautzenberg, "Watermarking Images," Department of Microelectronics and Electrical Engineering, Trinity College Dublin, 47 pages, Oct. 1994.

Tirkel et al., "Electronic Water Mark," DICTA-93, Macquarie University, Sydney, Australia, Dec., 1993, pp. 666-673.

Weber et al., "Correlative Image Registration," seminars in Nuclear Medicine, vol. XXIV, No. 4, Oct. 1994, pp. 311-323.

Brassil et al., Electronic Marking and Identification Techniques to Discourage Document Copying, Proceedings of INFOCOM '94 Conference om Computer, IEEE Commun. Soc. Conference, Jun. 12-16, 1994, 1278-1287.

Bruckstein, A.M.; Richardson, T.J., A holographic transform domain image watermarking method, Circuits, Systems, and Signal Processing vol. 17, No. 3 p. 361-89, 1998, This paper includes an appendix containing an internal memo of Bell Labs, which according to the authors of the paper, was dated Sep. 1994.

"High Water FBI Limited Presentation Image Copying Protection Software," FBI Ltd brochure, Jul., 1995, 17 pages.

Koch et al., "Copyright Protection for Multimedia Data,"Fraunhofer Institute for Computer Graphics, Dec. 16, 1994, 15 pages.

Koch et al., "Towards Robust and Hidden Images Copyright Labeling," Proc. of 1995 IEEE Workshop on Nonlinear Signal and Image Processing, Jun. 20-22, 1995, 4 pages.

Kurak et al., "A Cautionary Note On Image Downgrading," 1992 IEEE, pp. 153-159.

Mintzer et al., "Safeguarding Digital library Contents and Users" Digital Watermarking D-Lib Magazine, Dec. 1997: ISSN 1082-9873.

Rindfrey, "Towards an Equitable System for Access Control and Copyright Protection in Broadcast Image Services: The Equicrypt Approach," Intellectual Property Rights and New Technologies, Proc. of the Conference, R. Oldenbourg Verlag Wien Muchen 1995, 12 pages.

Schreiber et al., "A Compatible High-Definition Television System using the Noise-Margin Method of Hiding Enhancement Information," SMPTE Journal, Dec. 1989, pp. 973-879.

SDMI Examples Use Scenarios (Non-Exhaustive), Version 1.2, Jun. 16, 1999.

Szepanski, "Additive Binary Data Transmission for Video Signals," Papers Presented at Conf. Of Comm. Engineering Soc. Sep. 30-Oct. 3, 1980, Technical Reports vol. 74, pp. 342-352.

Tanaka et al., "A Visual Retrieval System with Private Information for Image Database," Proceeding International Conference on DSP Applications and Technology, Oct. 1991, pp. 415-421.

Tanaka et al., "New Integrated Coding Shemes for Computer-Aided Fascimile," Proc. IEEE Int'l Conf. on Sys. Integration, Apr. 1990, pp.275-281.

Peairs, "Iconic Paper," Proceedings of the Third International Conference of Document.

Bloomberg, "Embedding Digital Data on Paper in Iconic text" SPIE vol. 3027, Document Recognition IV, pp. 37-80 (1997).

Johnson, et al., "Bridging the Paper and Electronic Worlds: The Paper User Interface", Interchi '93, pp. 2507-512, Apr. 1993.

Newman, William, et al., "A Desk Supporting Computer-Based Interaction with paper Documents," ACM Conference on Human Factors in Computing Systems (CHI '92) May 3-7, 1992, pp. 587-592.

Rao, et al., "Protofoil: Storing and Finding the Information Worker's Paper Documents in an Electronic File Cabinet," Human Factors in Computing Systems (CHI '94), pp. 180-186, Boston, MA, Apr. 1994.

Whittaker, et al., "Bake to the Future: Pen and Paper Technology Supports Complex Group Coordination," CHI '95, Conference on Human Factors in Computing Systems, Denver, Colorado (May 7-11, 1995) (text copy obtained from ACM).

Zhao, "A. WWW Service to Embed and Prove Digital Copyright Watermarks," Fraunhofer Institute for Computer Graphics, Proc. of EU Conf. on Multimedia Applications, Services and Techniques, May 1996, 15 pages.

* cited by examiner

SUBSTITUTING OBJECTS BASED ON STEGANOGRAPHIC ENCODING

RELATED APPLICATION DATA

This application is a continuation of U.S. patent application Ser. No. 11/145,515, filed Jun. 3, 2005 (now U.S. Pat. No. 7,209,573), which is a continuation of U.S. patent application Ser. No. 10/448,544, filed May 29, 2003 (now U.S. Pat. No. 6,917,691), which is a continuation of U.S. patent application Ser. No. 09/473,396, filed Dec. 28, 1999 (now U.S. Pat. No. 6,577,746). Each of these patent documents is hereby incorporated by reference.

FIELD OF THE INVENTION

The present invention relates to data processing, and more particularly relates to use of watermark technology for object substitution.

BACKGROUND AND SUMMARY OF THE INVENTION

Object linking and embedding ("OLE," sometimes also known as dynamic data exchange, or "DDE") is a well-known data processing construct by which a first digital object (e.g., a graph) can be embedded within a second digital object (e.g., a word processing document). In some embodiments, the embedding is static. That is, once the embedding takes place, subsequent changes to the first digital object (e.g., the graph) are not reflected in the second, composite digital object (e.g., the document). In other embodiments, the embedding is dynamic (and thus more commonly termed linking rather than embedding). In such arrangements, if the graph is changed, the document is automatically updated to incorporate the latest version of the graph.

The technology underlying OLE is sophisticated, but is well understood by artisans in the field. Reference may be made to the many patents (e.g., U.S. Pat. Nos. 5,581,760 and 5,581,686) and reference books (e.g., Brockschmidt, *Inside OLE* 2, Microsoft Press, Redmond, Wash., 1994) on the subject for further details.

In accordance with the present invention, OLE-like principles are implemented using watermark data in digital objects in order to effect object linking or embedding.

In one illustrative embodiment, a photocopier scans an original paper document to produce image data. This image data is analyzed for the presence of watermark data that identifies the graphic(s) on the document. With this watermark identifier, the photocopier can query a remote image database for pristine image data corresponding to the graphic(s) on the document. This pristine data can be relayed from the remote database to the photocopier and substituted into the scanned image data. Output printed from the photocopier is thus based, at least in part, on pristine image data, rather than on image data that has been subjected to various corruption mechanisms (e.g., degradation of the original paper document, artifacts due to scanning, etc.).

The foregoing and other features and advantages of the present invention will be more readily apparent from the following detailed description, which proceeds with reference to the accompanying drawings.

DETAILED DESCRIPTION

Figure 1:
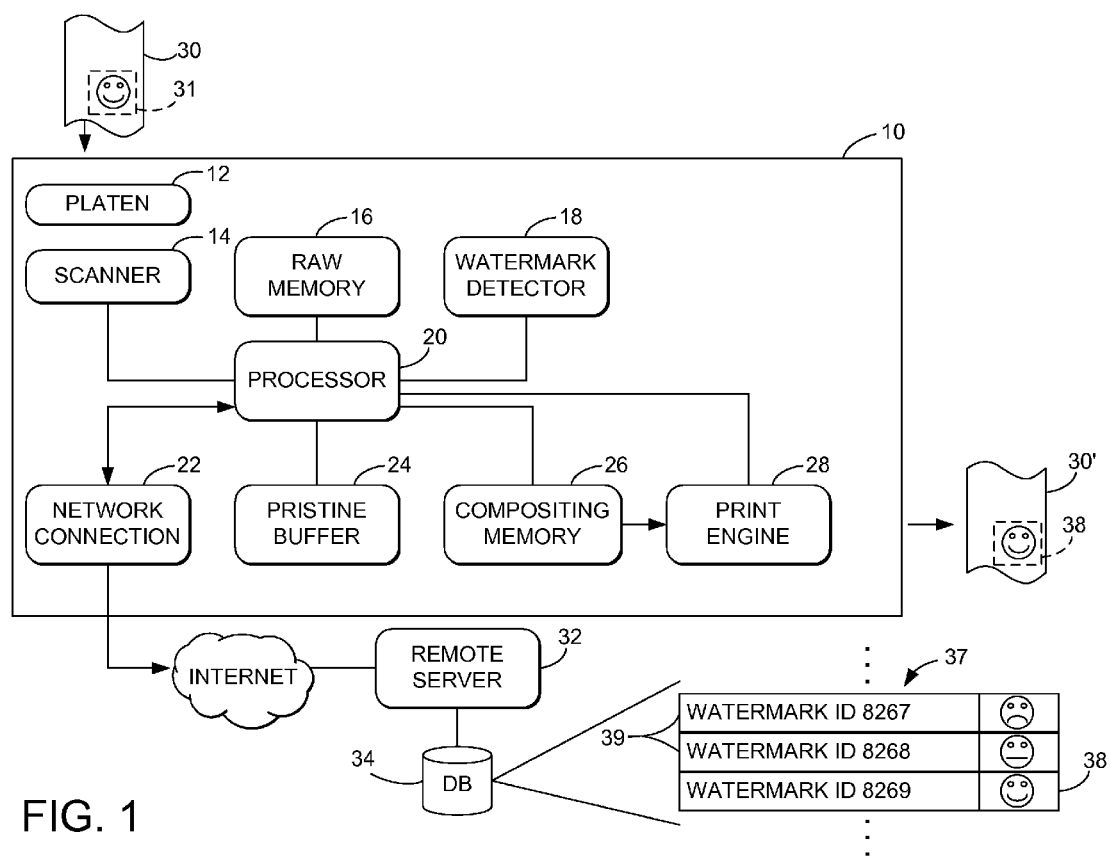
FIG. 1 shows an apparatus according to one embodiment of the present invention.

Referring to FIG. 1, an illustrative embodiment of the present invention is a photocopier 10. The photocopier includes a platen 12, a scanner assembly 14, a raw data memory 16, a watermark decoder 18, a processor 20, a network connection 22, a pristine image buffer 24, a compositing memory 26, and a reproduction engine 28.

A paper document, such as document 30, is placed on platen 12, and scanner assembly 14 is activated to generate scan data corresponding to the document. The scanner assembly is conventional and may include a linear array of CCD or CMOS sensor elements that optically scans along an axis of the platen to generate 2D image data. Alternatively, the scanner can comprise a 2D array of sensor elements onto which an image of the document is projected through one or more lenses. In the illustrated embodiment, the document 30 includes a picture 31 that is encoded with a plural-bit digital watermark. Document 30 may be referred to as a compound document since it incorporates plural components (e.g., text and picture).

The scan data from the scanner assembly 14 is stored in the raw data memory 16, where it is analyzed for the presence of watermark data by the watermark decoder 18.

There are many different techniques by which imagery can be digitally watermarked and decoded. One is the Digimarc watermark system detailed, e.g., in U.S. Pat. No. 5,862,260, and in pending application Ser. No. 09/452,023, filed Nov. 30, 1999 (now U.S. Pat. No. 6,408,082), the disclosures of which are incorporated herein by reference. A great variety of other systems are known. All that is required is that the watermark permit the conveyance of plural-bit auxiliary data without objectionable image degradation.

Upon detection of the watermark in picture 31, the processor 20 is programmed to initiate communication with a remote server 32 (e.g., over the internet) through the network connection 22. The programmed processor sends to the server a query message identifying the detected watermark (which may be, e.g., an identifier of 16-64 bits). A database 34 at the server 32 searches its records 37 for a digital object indexed by that watermark ID 39 and, if located, causes a pristine version of the object 38 (in this case a pristine version of the picture 31) to be sent to the photocopier.

In the embodiment illustrated, the database has the pristine version of the object stored within the database record for that watermark ID, and relays same directly back to the photocopier. In other embodiments, the object itself is not stored in the database. Instead, the database stores (in a record associated with the watermark ID) the address of a remote data repository at which the pristine object is stored. In this case the object server 32 can transmit an instruction to the remote repository (e.g., again over the internet), requesting the remote repository to provide the pristine object. The object can be sent directly from the remote data repository to the photocopier, or may be relayed through the object server 32. In any case, the pristine object may be provided in TIFF, JPEG, GIF, or other format. (In some embodiments, the request signal from the photocopier specifies the format desired, or may specify plural formats that the photocopier can accept, and the pristine object is then output by the server 32 or remote repository in such a format. In other embodiments, the request signal from the photocopier does not include any format data.)

In some embodiments, the object server 32 can be of the sort more particularly detailed in copending application 60/164,619 (filed Nov. 10, 1999), and Ser. No. 09/343,104 (filed Jun. 29, 1999), the disclosures of which are incorporated herein by reference.

In addition to detecting the ID of any watermark in the scanned image data, the photocopier's watermark detector also discerns the placement of the watermarked picture within the document image, and its state (e.g., size, rotation, etc.), and produces corresponding state information. In some embodiments, this state information is passed to the object server 32, permitting the pristine object 38 to be sized/rotated/etc. (e.g., by the object server) to match the object detected in the document image. In other embodiments, a generic version of the pristine object is passed back to the photocopier, and the processor 20 attends to sizing, rotating, etc., of the pristine picture 38 as necessary to match that of the original picture 31.

In some embodiments the picture 31 in the paper document has been cropped. (The watermark can nonetheless be detected from the cropped image.) When the pristine picture 38 is received from the remote location, it can be pattern-matched to the picture 31 detected in the original document to determine the cropping boundaries (if any), and corresponding cropping of the pristine picture can be effected.

Once the foregoing scaling/rotation/cropping, etc., adjustments (if any) have been made on the pristine picture 38 stored in buffer 24, the processed pristine picture is combined with the original document scan data in compositing memory 26, yielding a composite document image that includes the pristine picture data 38 in lieu of the scanned picture 31. (The substitution of the pristine picture for the original picture data can be accomplished by various known image processing techniques, including masking, overwriting, etc.) The composite document image is then passed to the reproduction engine 28 to produce a hard-copy output (i.e., an enhanced compound document 30') in the conventional manner. (The reprographic engine 28 can take many different forms including, e.g., xerography, ink-jet printing, etc.)

The pristine picture 38 received from the server 32 can, itself, be watermarked or not. If watermarked, the watermark will usually convey the same payload information as the watermark in the original picture 31, although this need not always be the case. In other embodiments, the pristine picture 38 received from the remote server 32 has no watermark. In such case the pristine picture can be substituted into the compound document 30 in its unwatermarked state. Alternatively, the apparatus 10 can embed a watermark into the picture prior to (or as part of) the substitution operation.

If the substituted picture is watermarked, this permits later watermark-based enhancement or updating. For example, if the enhanced compound document 30' including the pristine picture 38 is printed by the photocopier, and the resulting photocopy is thereafter photocopied, the latter photocopying operation can again substitute pristine picture data for the scanned picture data produced by the second photocopier's scanner. Moreover, in applications where it is appropriate for a picture to be updated with the latest version whenever printed, the watermarking of the picture 38 permits substitution of a latest version whenever the document is scanned for printing.

In other situations, it is desirable for the picture 38 included in the enhanced compound document 30' to be unwatermarked. This is the case, for example, in certain archival applications where it is important that the document 30' not be changed after archiving. By assuring that the picture 38 is not watermarked, inadvertent changing of the picture in subsequent photocopying can be avoided. (In cases where the pristine image 38 is provided from server 32 in a watermarked state, the photocopier may remove or disable the watermark in response to corresponding instructions from a user through a user interface or the like.)

From the foregoing, it will be recognized that the illustrative embodiment can produce "photocopies" that are better than the "originals." This is accomplished by watermark-based substitution of pristine digital objects to replace less pristine counterparts.

Having described and illustrated the principles of our invention with reference to an illustrative embodiment, it will be recognized the invention is not so limited.

For example, while the invention is particularly illustrated with reference to a photocopier, the same principles are equally applicable in other systems, including personal computers (e.g., in conjunction with image editing software, such as Adobe Photoshop). In such case the input image data needn't come from a scanner but may come, e.g., from a digital file, from a network location, etc.

Likewise, while the invention is particularly illustrated with reference to picture (i.e., graphic) data, the same principles are equally applicable in connection with other data types, such as video, sound, text, etc. Moreover, the reference to "documents" is illustrative only; the invention can similarly be employed with any compound object that includes a watermarked component—whether in digital or analog form.

While the detailed embodiment is described as using separate raw data memory 16, pristine image buffer 24, and compositing memory 26, more typically some or all of these functions are served by a single memory, which may be a computer system's main RAM memory.

Likewise, while the detailed embodiment employs a processor 20 programmed in accordance with software instructions (e.g., stored in a memory or on a storage medium), in other embodiments some or all of the described functionality can be achieved using dedicated hardware (e.g., ASICs), or programmable hardware (e.g., PLAs).

Still further, while the invention is illustrated with reference to an arrangement in which a document includes a single watermarked photograph, it will be recognized that plural such watermarked components may be present in a compound document, and the system may be arranged to obtain pristine versions of each, and edit/composite same as necessary as to recreate an enhanced version of the original document.

Moreover, while the illustrative embodiment contemplates that a watermarked photograph may be a component of the original document, in other embodiments the watermarked object may comprise the entirety of the original document.

While reference has been made to substitution of pristine image components, in some embodiments it may be desirable to substitute components that are not "pristine." Indeed, in some embodiments an object may be substituted that is visually dissimilar to the original object. Consider artwork for a Christmas card. The artwork may include a watermarked "generic" corporate logo. When encountered by a computer according to the present invention, the generic logo may be replaced with a logo corresponding to the corporate owner of the computer. In such case, the substitute imagery may be stored within the computer itself, obviating the need for any network connection. The registry database maintained by the computer's operating system may include keys defined by watermark IDs. When a watermark ID is encountered, the registry database can be consulted to identify a corresponding graphic that can be substituted into the object being processed. If none is found, the watermark ID can be passed to the remote server 32.

While, for expository convenience, the illustrative embodiment was described as always substituting pristine data when available, more typically this is a function that would be enabled or disabled by an operator of the device, e.g., by an appropriate switch, button, or user interface control. In some embodiments, the device may be arranged to query the user when substitution of a pristine component is possible, in some cases presenting the user with a depiction of the image component proposed to be substituted.

The illustrative embodiment may be said to employ watermark-based object embedding, since the hard-copy output is static (i.e., cannot change) after printing. In other embodiments, the enhanced compound document 30' is not printed, but stored. Each time the compound document is utilized (e.g., opened for editing, or printed), any watermarked component(s) therein can be updated to include the latest-available version(s) of the watermarked component(s). In such case, the document may be said to employ watermark-based object linking.

In view of the many embodiments to which the principles of our invention may be applied, it should be apparent that the detailed embodiment is illustrative only and should not be taken as limiting the scope of our invention. Rather, we claim as our invention all such modifications as may fall within the scope and spirit of the following claims, and equivalents thereto.

What is claimed is:

1. A method comprising:
   receiving an identifier obtained from a steganographically encoded media object;
   accessing memory associated with at least a portion of the identifier to obtain an address of a remote data repository, the remote data repository including at least a plurality of substitute media objects corresponding respectively to a plurality of identifiers;
   forwarding: i) at least a portion of the identifier obtained from the steganographic encoding, and ii) an instruction to the remote data repository at the address,
   wherein the instruction includes a request to provide a substitute media object corresponding to at least a portion of the identifier obtained from the steganographic encoding.

2. The method of claim 1 further comprising receiving the substitute media object from the remote data repository.

3. The method of claim 2 further comprising forwarding the substitute media object to a remotely located consumer device.

4. The method of claim 1 wherein the substitute media object comprises a more pristine media object relative to the steganographically encoded media object.

5. The method of claim 1 wherein the instruction further comprises a request to provide the substitute media object directly to a remotely located consumer device.

6. The method of claim 1 wherein the media object comprises at least audio, video or an image.

7. The method of claim 6 wherein the substitute media object comprises at least audio, video or an image.

8. The method of claim 1 wherein the steganographically encoded media object is encoded with digital watermarking.

9. A method comprising:
   receiving: i) an identifier obtained from a steganographic encoding encoded in a media object, and ii) state information associated with the steganographic encoding or associated with the media object;
   obtaining—from a storage location—a substitute media object corresponding to the identifier;
   adjusting the substitute media object in accordance with the state information;
   providing the adjusted, substituted media object.

10. The method of claim 9 wherein the state information corresponds to size, synchronization or rotation.

11. The method of claim 9 wherein the media object comprises at least audio, video or an image.

12. The method of claim 11 wherein the substitute media object comprises at least audio, video or an image.

13. The method of claim 9 wherein the steganographic encoding comprises digital watermarking.

14. The method of claim 9 wherein the substitute media object comprises a more pristine media object relative to the encoded media object.

15. A method comprising:
   in a consumer device:
      obtaining an identifier from steganographic encoding that is encoded in a media object;
      querying a data repository in the consumer device to determine whether substitute information corresponding to the identifier is located therein, the substitute information to be substituted for or in the media object by the consumer device, and if the substitute information is not located therein, querying a data repository remote from the consumer device to determine whether substitute information corresponding to the identifier is located therein, the substitute information to be substituted for or in the media object by the consumer device; and
      and once substitute information is obtained, substituting obtained substitute information for or in the media object.

16. The method of claim 15 wherein the media object comprises at least audio, video or an image.

17. The method of claim 16 wherein the substitute information comprises at least audio, video or an image.

18. The method of claim 15 wherein the steganographic encoding comprises digital watermarking.

19. The method of claim 15 wherein the substitute information comprises more pristine information relative to information of the media object.

20. A method to provide a substitute object for an original media object, wherein the substitute object is to be provided in a copy of the original media object, and wherein the original media object comprises steganographic encoding including a plural-bit identifier, said method comprising:
   decoding the steganographic encoding from the original media object or data representing the original media object to obtain the plural-bit identifier;
   using the plural-bit identifier to request the substitute object from a remote location;
   receiving the substitute object from the remote location; and
   when generating a copy of the original media object, using the substitute object to augment or replace the original media object.

21. The method of claim 20 wherein the steganographic encoding comprises digital watermarking.

22. The method of claim 20 wherein the original media object comprises audio or video.

23. The method of claim 22 wherein the substitute object comprises audio or video.

24. The method of claim 20 wherein the substitute object comprises more pristine version relative to the original media object.

25. The method of claim 20 wherein the substitute object only replaces a portion of the original media object when making a copy.

* * * * *